(No Model.)
G. RICHARDSON.
MULTIFLUE PIPE AND COUPLING SECTION.
No. 259,048. Patented June 6, 1882.
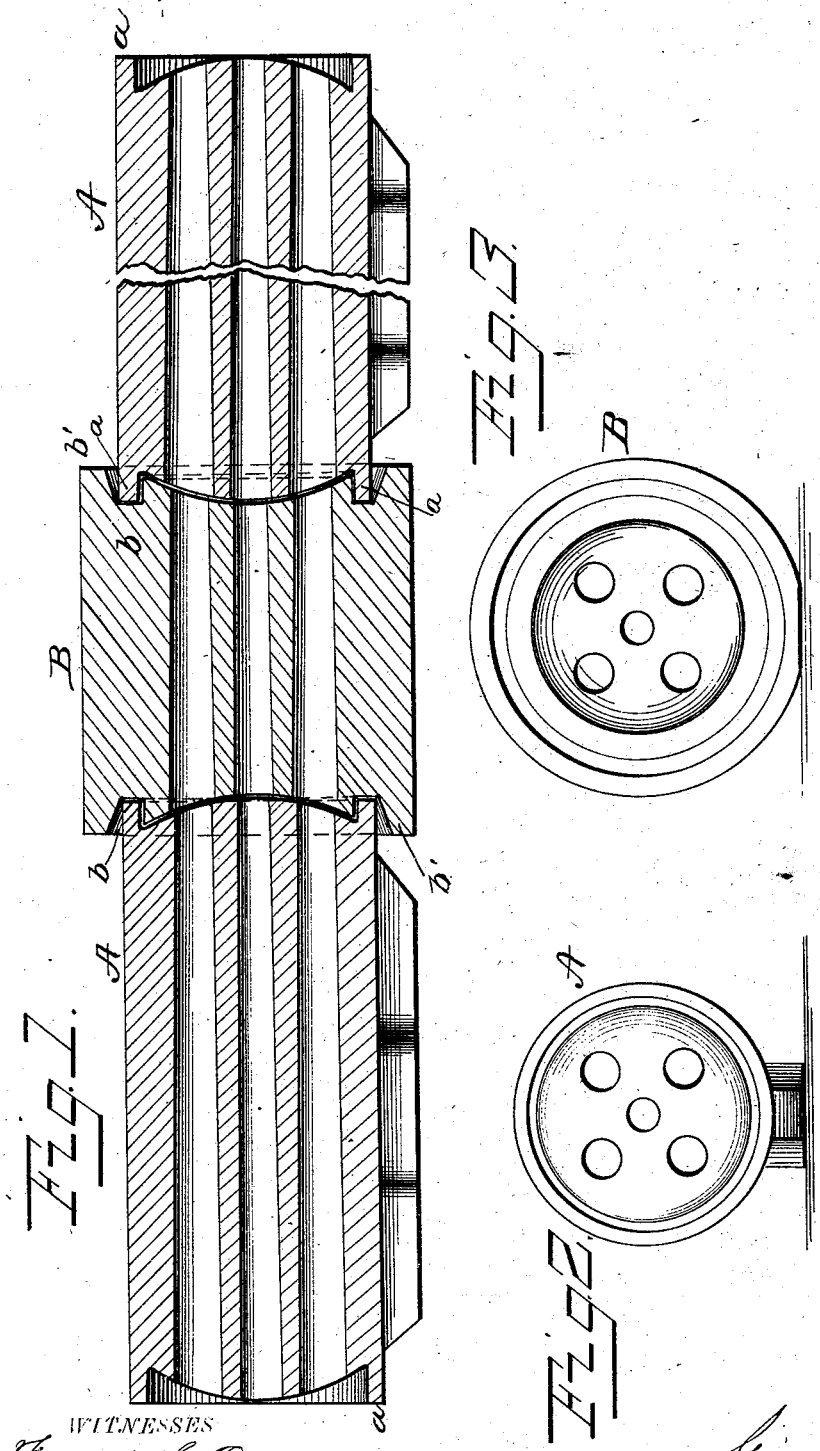

United States Patent Office.

GEORGE RICHARDSON, OF PHILADELPHIA, PENNSYLVANIA.

MULTIFLUE PIPE AND COUPLING-SECTION.

SPECIFICATION forming part of Letters Patent No. 259,048, dated June 6, 1882.

Application filed May 4, 1882. (No model.)

*To all whom it may concern:*

Be it known that I, GEORGE RICHARDSON, a citizen of the United States, residing at Philadelphia, in the county of Philadelphia and State of Pennsylvania, have invented certain new and useful Improvements in Multiflue Pipes and Coupling-Sections; and I do hereby declare the following to be a full, clear, and exact description of the invention, such as will enable others skilled in the art to which it appertains to make and use the same.

This invention relates to multiflue pipes and coupling-sections in general, being, however, more especially designed for use on cement or terra-cotta pipes.

It consists mainly in constructing the ends of the pipes and coupling-sections respectively with interlocking convex and concave areas or portions within their rim-joints, in order that they may be reciprocally supported against lateral displacement in every direction to preserve the integrity of the rim-joints.

In order that my invention may be clearly understood, I have illustrated in the annexed drawings and will proceed to describe the best form thereof at present known to me.

Figure 1 is an axial section of two multiflue pipes connected by a coupling-section. Fig. 2 is an end view of one of the pipes. Fig. 3 is an end view of the coupling-section.

The same letters of reference indicate identical parts in all the figures.

A refers to the multiflue pipes, and B to the multiflue coupling-section, each provided with four large and one smaller flue, the flues being shown as made slightly tapering, so that the pipes and coupling-section may be so connected that the larger end of the flues of one will register with and cover the smaller end of the flues of the preceding pipe or coupling-section. In multiflue pipes and coupling-sections part of the area over which the flues are distributed must of necessity be solid, forming a sort of spider-web across the pipe or coupling-section. Advantage is taken of this fact to produce interlocking convex and concave portions over these areas of the pipes and coupling-sections. Each end of the multiflue pipes is made convex, the convexity covering an area somewhat greater than the area occupied by the flues, and this convex area is encircled by a projecting rim, *a*. The rim *a* is made preferably so as not to project beyond the apex of the convex area, in order that said rim may be in a measure protected thereby in handling and transporting the pipes. Each end of the coupling-section B is constructed with a corresponding concave area, around which an annular recess, *b*, is formed, bounded by a rim, *b'*, the interior side of which may be chamfered, so as to give a flaring form to the annular recess. The depth of the recess should be a little in excess of the length of the rim *a* of the pipe, so that when the coupling-section and pipe are joined the convex face of the pipe end may be pressed closely against the concave face of the end of the coupling-section.

It will be observed that, the convexity of the pipe being interlocked with the concavity of the coupling-section, they cannot move laterally on each other, being reciprocally supported across in every direction.

Cement or calking will be introduced into the flaring portion of recess *b*, around the exterior of the pipe, to form a tight rim-joint, the integrity of which will also be preserved by the interlocking convex and concave portions of the pipe and coupling-section.

Although I prefer to form the convex portions on the ends of the pipes and the corresponding concavities in the ends of the couplings, yet it is obvious that the construction may be reversed without departing from the principle of my invention in any essential particular.

In pipes constructed with a bell-mouth at one end, adapted to receive the spigot end of a similar pipe, so that no separate coupling-sections are required in laying a line of pipes, the bell-mouth of the pipe will be constructed like one end of the coupling hereinbefore described, so that the spigot end of a similar pipe will fit it.

Having thus described my invention, what I claim is—

1. A multiflue pipe each end of which is constructed with a convex area and an encircling-rim, substantially as before set forth.

2. A multiflue coupling-section each end of which is constructed with a concave area surrounded by an annular recess, which is in turn encircled by a rim, substantially as before set forth.

3. The combination, substantially as before set forth, of a multiflue pipe and a multiflue coupling-section having interlocking convex and concave portions, respectively, at their ends, the pipe being also constructed with a surrounding rim and the coupling-section with a corresponding annular recess encircled by a rim.

In testimony whereof I affix my signature in presence of two witnesses.

GEORGE RICHARDSON.

Witnesses:
C. A. NEALE,
EWD. F. WALKER.